Oct. 30, 1962 V. FLAX 3,060,653
MULTI-RECEPTACLE PLASTIC CONTAINER
Filed Nov. 10, 1959
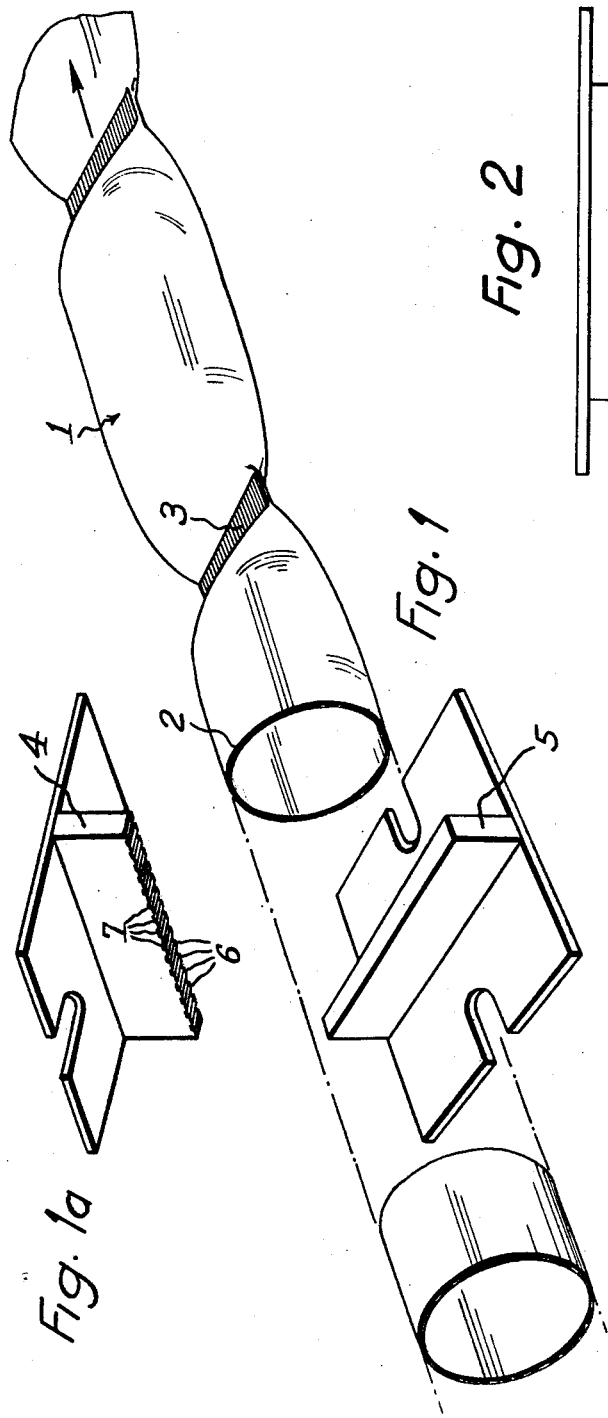
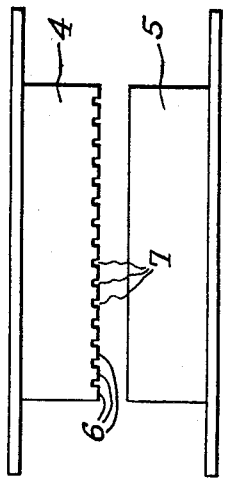
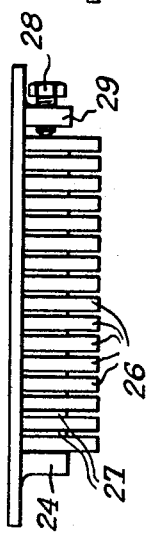

United States Patent Office 3,060,653
Patented Oct. 30, 1962

3,060,653
MULTI-RECEPTACLE PLASTIC CONTAINER
Valer Flax, Vic-Fezensac, France
Filed Nov. 10, 1959, Ser. No. 852,151
Claims priority, application France Nov. 10, 1958
4 Claims. (Cl. 53—28)

This invention relates to the production of multi-receptacle plastic containers of the type comprising a continuous tubular casing or sheath of plastic sheet material, which is filled with a fluid product and is thereafter sealed off at a plurality of transverse lines spaced longitudinally of the tubular casing by the application of electric current, so as to provide a plurality of isolated receptacles each containing a substantially equal dose of said product sealed off within it. In use, such individual receptacles are adapted to be broken off one by one across each sealing or welding line according to demand.

In the production of such containers the usual procedure is to feed the tubular casing filled with its fluid contents stepwise through the space between a pair cooperating welding members or electrodes which may include a stationary lower member or anvil, and an upper member that is movable up and down in timed relation with the incremental advance of the plastic tubular casing so as to clamp the latter intermittently along the selected sealing lines between the adjacent surfaces of both welding members for the sealing or welding operation. During each clamping period of this cyclic process a suitable electric current may be fed to the welding members so as to soften or fuse the plastic material of the container and provide the desired transverse seal. The current used for this purpose generally is high-frequency alternating current.

Certain difficulties have been encountered in the performance of the sealing process just described. While the process is generally quite satisfactory where the thickness of the sheet material from which the tubular casing is made is relatively great, it is much less successful in cases where such casing is made from comparatively thin plastic sheet material; this is unfortunate since it would otherwise be very desirable to use thin thermoplastic sheet and thereby reduce the amount and cost of container material required. One difficulty encountered in this connection is that the sealing of thin plastic material by means of high-frequency current somewhat paradoxically requires the expenditure of more electric power than the formation of a similar seal in thicker material of the same kind. It has been known for some time from tests conducted in this connection that in the high-frequency welding of thermoplastic sheet materials the requisite power, all other things remaining equal, is an inverse function of the sheet thickness. While the reason has not been fully explained, it is believed to be connected with the type of molecular motion occurring in the sheet material when exposed to a high-frequency electric field. Whatever the explanation, it has until now not been found possible successfully to produce containers of the type described made from thin plastic sheet while using the low-powered welding machines designed for the sealing of thick-walled plastic containers. Moreover, with such thin-walled containers it is found that the internal pressure of the fluid contents tends to build up during the sealing operation to such a high degree that the heat-softened plastic material is apt to split at the ends of the seal towards the end of the sealing step, so that some of the contents of the tube is liable to flow out and be lost.

One object of this invention therefore is to provide an improved method of making sealed-off plastic tubular containers of the kind specified, which will be especially applicable for use with containers of relatively thin wall thickness and thereby to enable a reduction in the amount of necessary material and the cost price of the finished product. Another object is to reduce the consumption of electric energy involved in the sealing of thin-walled plastic sheet containers. An object also is to produce a more reliable and safer seal. Further objects lie in the provision of improved apparatus for the performance of the novel method.

In an important aspect, the invention comprises exerting pressure only at a number of spaced points along the desired sealing line across the tubular casing, applying welding energy at said spaced points to seal the container at said points while maintaining open passages through the container in the spaces between said points, and continuing the application of welding energy long enough to cause the plastic material to flow from said points across the intervening spaces and thereby provide a full continuous seal across the tubular casing.

It is found that with this procedure it is possible to form a fully effective seal across a thin-walled plastic tubular container with considerably less electric power output than was heretofore required, and also that the resulting seal does not tend to part at the ends during the welding step, as was hitherto the case with such thin-walled containers.

Exemplary embodiments of the invention will now be described for purposes of illustration but not of limitation with reference to the accompanying drawings, wherein:

FIGURE 1 is a simplified, perspective view illustrating the improved method and showing part of a tubular casing and an electrode for performing the method of the invention;

FIGURE 1a shows in perspective a serrated electrode adapted to cooperate with the electrode in FIG. 1, to effect a sealing according to the invention.

FIGURE 2 is an elevational view of a pair of improved electrodes of the kind shown in FIGURES 1 and 1a, and FIGURE 3 is an elevational view of a modified electrode.

As shown in FIGURE 1 a tubular casing 1 of thin-walled thermoplastic material 2 has a number of longitudinally spaced transverse seals 3 formed across its width so as to provide a number of isolated compartments such as 1 each of which contains a predetermined amount of fluid goods, e.g. liquid, sealed off within it. For this purpose the tubular casing 2 is fed lengthwise in the direction of the arrow at the right of the drawing, from a filling station not shown in which it is filled with the desired fluid contents, and through a welding station comprising the welding or sealing members or electrodes 4—5.

The pair of welding members may comprise a stationary lower sealing member 5 and a movable upper sealing member, 4, and suitable conventional mechanism, not shown, is provided for reciprocating the upper member 4 towards and away from the fixed member 5 in timed relation with the step-by-step advance of the tubular casing through the sealing station. Such mechanism may be entirely similar to what is conventionally used in similar processes at the present day and forms no part of the invention.

The supply of welding energy to the members 4 and 5 may likewise be conventional and has not been shown. Preferably though not necessarily high-frequency alternating current is used. It is to be understood that the invention while especially advantageous with this type of welding energy is not limited thereto since its advantages are present whatever the method used for the application of heat to the walls of the thermoplastic sheet container. Thus the sealing members 4 and 5 may be supplied with direct current, or heat may be applied therethrough by other means.

In accordance with the invention and as seen in FIG.

1a, sealing member 4 has its active surface formed with serrations such as ridges 6 and intervening grooves 7. The ridges 6 and intervening grooves 7 extend generally parallel to the length of the tube, that is to say transversely to the weld or sealing line 3. While in the exemplary embodiment shown, only the upper sealing member 4 has been shown thus serrated and the lower member 5 is shown as having a smooth active surface, it will be understood that the relationship may be reversed if desired, or that both members may have complementarily serrated surfaces.

In operation, with the tubular casing 2 intermittently advanced in the direction of the arrow and with the upper member 4 moved into and out of engagement with the lower member 5 in timed relationship with the feed of the tubular casing as previously explained, it will be seen that every time the upper member is clamped down pressure is exerted against the plastic sheet material only at spaced points across the width of the tubular casing owing to the serrated configuration of the active surface of the upper welding member 4. The application of welding energy e.g. high-frequency alternating current, to the members thus initially causes fusion of the thermoplastic material at those spaced points only, in the manner of a spot-weld, while the intervening spaces between such points remain initially open, and in fact provide free passages through which the fluid contents of the casing is able to flow back and forth. As the application of welding current is continued however, the fused thermoplastic material flows from the points at which the seal was initiated and after a short but definite time fills the entire cross section of the area undergoing the sealing operation, so that on subsequent setting of the plastic material a continuous seal is provided across the width of the casing.

It is found that when the sealing operation is conducted in the progressive manner described the welding action is smoother and more uniform than is the case when the welding pressure and energy is applied continuously across the full width of the material as in conventional machines of the contemplated type, and that a fully successful seal is formed even with thin-walled thermoplastic tubes when using high-frequency alternating current of relatively low power.

Owing to the fact that the fluid contents of the casing is able to flow freely to and fro through the passages between the spaced points at which the seal is initiated throughout a substantial portion of the welding operation before said fluid contents is finally sealed off, a balance of pressures is struck in the fluid contents across the seal, and there is no build-up of internal pressure near the opposite ends of the seal at the lateral sides of the tube, which pressure build-up in conventional processes tended to result in a tearing of the sheet material at the sides of the tube owing to the sharp curvature present at the said sides, especially when thin sheet material was used.

FIGURE 2 illustrates an elevational view of the operative relation between the welding electrode assembly. The upper and lower electrodes are designated respectively 4 and 5. The active surface of the upper electrode 4 is seen to be formed with grooves 7 defining the intervening ridges 6. Obviously the precise configuration of said surface may be altered and the width ratio between the grooves and ridges may vary with the composition of the thermoplastic material used and other factors.

FIGURE 3 illustrates a modified form using a more elaborate electrode construction, wherein the electrode comprises a set of parallel spaced conductive plates or strips 26 the ends of which define the ridges mentioned above, the strips 26 being separated by spacers 27 preferably of insulating material, the assembly being retained between side abutments 24 and 29 by means of a set screw 28 threaded into abutment 29. One advantage of this construction is that it affords the possibility of modifying the afore-mentioned ridge-to-groove width ratio mentioned above as by replacement of the spacers 27. A more versatile electrode is thus provided which may be used with a wider range of plastic compositions.

Various other modifications of welding members or electrodes may of course be devised by those familiar with the art in accordance with the teachings of this invention. Thus one or both members may be polygonal. Further the arrangement may be such as to provide a seal that is not a simple straight line extending perpendicularly across the width of the casing. Thus arrangements could very easily be conceived whereby such seal would be a straight line at an angle to the longitudinal extent of the casing; or a broken, e.g. herring-bone, line, or an arcuate line. Any of these results can readily be accomplished by imparting suitable shape in planar view to the active surfaces of the welding members of the type shown in FIGURES 1, 2 or 3; or, by imparting a suitable shape to the path of motion of the roller-like welding member referred to above.

I am aware that in apparatus for sealing thermoplastic tubular containers of the type here contemplated, it has already been suggested to use secondary pressure members or electrodes having recessed or serrated active surfaces. In all such prior arrangements however that I am aware of, such recessed or serrated pressure-members have always been used in combination with main electrodes having smooth active surfaces, the function of the secondary pressure members being simply to move the walls of the tubular casing closer towards each other at positions not far removed from the sealing electrodes. Thus in these prior arrangements the actual sealing or welding operation was performed in a single step, with the flow of fluid contents of the tube being sealed off practically instantaneously. In my invention, in contrast, a chief point is so to conduct the welding operation that in an initial stage thereof a free flow of the fluid contents is still permitted across the seal in process of formation.

What I claim is:

1. In a method of producing a multi-receptacle container for a fluid in which a continuous tube of thermoplastic sheet material containing fluid therein is provided, the steps comprising applying heat to said tube along longitudinally-spaced sealing lines substantially transverse of the tube to subdivide the tube into a multiplicity of fluid-filled receptacles, said heat being applied to discrete points spaced along said sealing line to weld said tube at said points only, whereby fluid communication is maintained between the receptacles of the tube on opposite sides of the lines through spaces between said points, continuing the application of heat at said points for a time sufficient to cause the material to flow to extend the welding along the entire sealing line across said tube to isolate said receptacles from one another.

2. A method comprising intermittently advancing a continuous tube of thermoplastic material containing a fluid therein, welding said material together at spaced points along a line inclined to the direction of advancement of the tube and with the tube at rest, to form a plurality of passageways providing communication between portions of the tube on opposite sides of the line and with the tube welded at said spaced points, and continuing said welding at said spaced points to cause flow of said material along said line and between said points to obturate said passageways and effect a welding all along said line to divide said tube into portions isolated thereat.

3. A method comprising intermittently advancing a continuous tube of thermoplastic material containing a fluid therein, heating the material of said tube only along a portion of a line extending inclinedly to the direction of advancement of the tube to fuse the material thereat, whereby fluid communication between the portions of the tube on opposite sides of the line is maintained through the unfused portion of said tube and continuing the application of heat to said material at said fused portion of the line to cause said material to flow to the remainder of the tube along the line to cause fusing thereat, whereby said material is finally fused all along said line to divide said tube thereat into isolated portions.

4. A method comprising advancing a continuous tube of thermoplastic containing a fluid in step-by-step relation past a station, heating the material at spaced discrete points along a line inclined with respect to the direction of advancement at said station and with the tube at rest thereat during said step-by-step advancement to weld the tube at said discrete points while establishing passageways therebetween enabling the free passage of fluid therethrough, continuing said heating at said points to cause melting of the material and flow thereof throughout the extent of said line to weld the tube along the entire line to form isolated chambers in said tube.

References Cited in the file of this patent

UNITED STATES PATENTS

| | | |
|---|---|---|
| 2,069,333 | Salfisberg | Feb. 2, 1937 |
| 2,358,246 | Nicolle | Sept. 12, 1944 |
| 2,430,995 | Roos | Nov. 18, 1947 |
| 2,469,975 | McCloy | May 10, 1949 |
| 2,530,400 | Rado | Nov. 21, 1950 |
| 2,761,264 | Gossett | Sept. 4, 1956 |
| 2,764,862 | Rado | Oct. 2, 1956 |
| 2,848,854 | Rado | Aug. 26, 1958 |
| 2,870,583 | Flax | Jan. 27, 1959 |
| 2,875,070 | Rockland et al. | Feb. 24, 1959 |
| 2,928,220 | Kannengiesser | Mar. 15, 1960 |
| 2,940,230 | Flax | June 14, 1960 |